Sept. 17, 1974  D. H. KIM ET AL  3,836,533
10-HYDROXY-2-PHENYL-5H-PYRIDO 1,2-a PYRIMIDO[4,5-a]-
PYRIMIDIN-5-ONE AND PROCESSES THERETO
Filed Oct. 30, 1972

3,836,533
10-HYDROXY - 2 - PHENYL - 5H-PYRIDO[1,2-a] PYRIMIDO[4,5-d]-PYRIMIDIN - 5 - ONE AND PROCESSES THERETO

Dong H. Kim, Wayne, and Arthur A. Santilli, Havertown, Pa., assignors to American Home Products Corp., New York, N.Y.
Filed Oct. 30, 1972, Ser. No. 302,381
Int. Cl. C07d 57/20
U.S. Cl. 260—256.4 F     5 Claims

ABSTRACT OF THE DISCLOSURE

10 - Hydroxy - 2 - phenyl - 5H-pyrido[1,2-a]pyrimido[4,5-d] pyrimidin-5-one and the alkanoyl ester thereof are prepared by thermal cyclization of a 4-(2-amino-3-pyridyloxy) - 2 - phenyl - 5 - pyrimidinecarboxylic acid, alkyl ester or of 4-[(3-hydroxy-2 - pyridyl)amino] - 2 - phenyl-5-pyrimidinecarboxylic acid, or the ester thereof.

---

Figure 1:
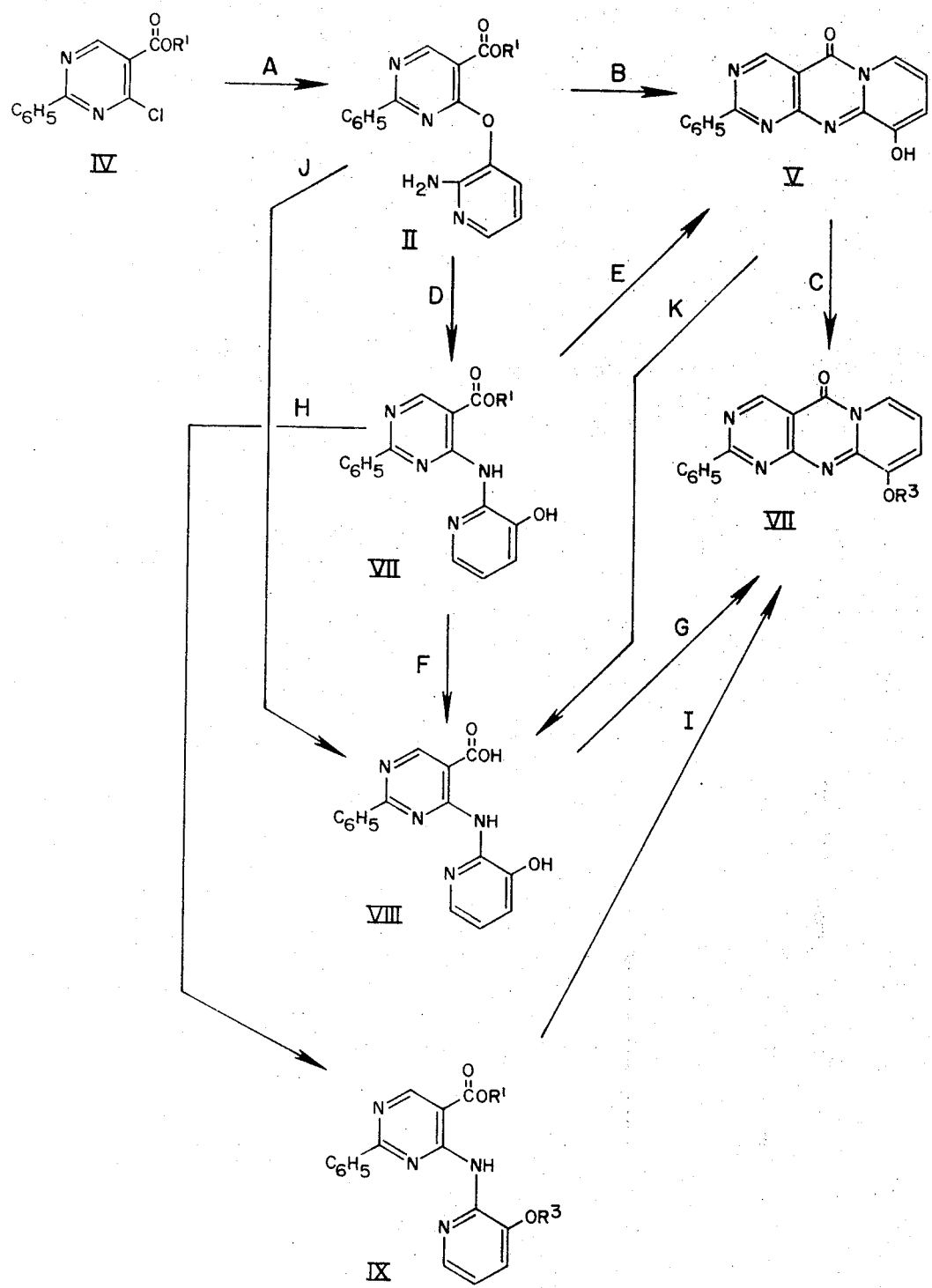

This invention relates to 10 - hydroxy - 2 - phenyl - 5H-pyrido[1,2 - a]pyrimido[4,5-d]pyrimidin - 5 - one and the lower alkanoyl esters thereof. Also contemplated are intermediates thereto and processes for the production thereof.

In its principal aspect, the invention sought to be patented comprises compounds of the structural formula:

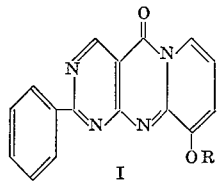

wherein R is hydrogen or lower alkanoyl. Said compounds (I) exert a depressant action on the central nervous system as demonstrated by evaluation in standard pharmacological test procedures.

In yet another aspect, the invention comprises compounds of the formula:

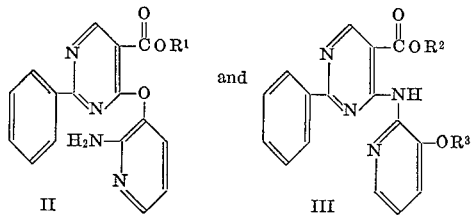

wherein $R^1$ is lower alkyl; $R^2$ is hydrogen or lower alkyl; and $R^3$ is hydrogen or lower alkanoyl; with the proviso that when $R^2$ is hydrogen, $R^3$ can only be hydrogen.

In still another aspect, the invention provides a process for the preparation of 10-hydroxy-2-phenyl-5H-pyrido [1,2-a]pyrimido[4,5-d]pyrimidin-5-one in which a 4 - (2-amino-3-pyridyloxy) - 2 - phenyl-5-pyrimidinecarboxylic acid, (lower)alkyl ester is heated at a temperature ranging from about 160° C. to about 260° C. A temperature ranging from about 190° C. to about 230° C. is preferred.

The production of 10 - hydroxy-2-phenyl - 5H-pyrido [1,2-a]pyrimido[4,5 - d]pyrimidin - 5 - one (V) and the lower alkanoyl esters thereof (VI) are illustrated schematically in FIG. I of the accompanying Drawing. In FIG. I, $R^1$ is lower alkyl and $R^3$ is lower alkanoyl.

Referring now to FIG. I, the starting material for the synthesis depicted therein is a 4-chloro-5-carb(lower)alkoxy - 2 - phenylpyrimidine (IV). Step A is effected by treating compound IV with 2-amino-3-hydroxypyridine in a lower alkanol (absolute) in the presence of metallic sodium, which affords a 4-(2 - amino - 3 - pyridyloxy)-2-phenyl - 5 - pyrimidinecarboxylic acid, (lower)alkyl ester (II). In Step B compound II is cyclized to give 10-hydroxy - 2-phenyl-5H-pyrido[1,2-a]pyrimido[4,5-d]pyrimidin - 5 - one (V) by heating at a temperature ranging from about 160° C. to about 260° C., preferably about 190° C. to about 230° C. Alkanoylation of compound (V) to yield the corresponding ester (VI) is effected by reaction with a conventional acylating agent, such as a lower alkanoic acid chloride or anhydride.

Compound V can alternatively be obtained in two steps from compound II as follows: In Step D, compound II is heated in a lower alkanol at reflux temperatures to give a 4 - [(3 - hydroxy - 2 - pyridyl)amino]-2-phenyl-5-pyrimidinecarboxylic acid, (lower)alkyl ester (VII). In Step E, compound VII is thermally cyclized by heating at a temperature ranging from about 160° C. to about 260° C., preferably about 190° C. to about 230° C.

Compound VI can, alternatively, be obtained by cyclization of either compound VIII (Step G) or compound IX (Step I). In Step G, the cyclization is effected by heating compound VIII in a lower alkanoic acid anhydride at reflux temperatures. In Step I, the cyclization is effected by heating compound IX at a temperature ranging from about 160° C. to about 260° C., preferably about 190° C. to about 230° C. Compound VIII is prepared either from compound II (Step J) or from compound VII (Step F) by hydrolysis with aqueous sodium hydroxide followed by acidification. Compound IX is prepared from compound VII (Step H) by alkanoylation with a lower alkanoic acid chloride or anhydride.

Compound VIII can also be obtained (Step K) by hydrolysis of compound V with aqueous sodium hydroxide followed by acidification.

The starting materials employed in the aforedescribed processes are either known compounds or can be prepared from known compounds by conventional methods.

As used herein and in the claims the terms "lower alkanoyl" and "lower alkanoic acid" contemplate such groups in which the alkyl moiety thereof is a methyl, ethyl, propyl, or isopropyl group. The term "lower alkyl" means the methyl, ethyl, propyl or isopropyl group.

When the compounds of the invention are employed as depressants of the central nervous system, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets or capsules containing such excipients as starch, lactose, magnesium stearate, and so forth. They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a dosage level that will generally afford effective results without causing any harmful or deleterious side effects.

The following examples illustrate the manner and process for making and using the invention:

EXAMPLE I 4-(2-Amino-3-Pyridyloxy)-2-Phenyl-5-Pyrimidine-Carboxylic Acid, Ethyl Ester Sodium (1.1 g.) is dissolved in absolute ethanol (170 ml.). To the solution at room temperature is added with stirring over a 10 minute period 2-amino-3-hydroxypyridine (5.6 g.). 4 - Chloro - 5 - carbethoxy-2-phenylpyrimidine (13 g.) is added, and the mixture is heated gently for 30 minutes. The mixture is chilled causing precipitation of a solid which is collected and washed with ethanol and then water to afford 13 g. of the title compound, m.p. 151–153° C. Recrystallization from ethanol gives a sample, m.p. 152–154° C.

Analysis for $C_{18}H_{16}N_4O_3$.—Calculated: C, 64.27; H, 4.80; N, 16.66. Found: C, 63.93; H, 4.85; N, 16.88.

EXAMPLE II

4-[(3-Hydroxy-2-Pyridyl)Amino]-2-Phenyl-5-Pyrimidine-Carboxylic Acid, Ethyl Ester A mixture of 4-(2-amino-3-pyridyloxy)-2-phenyl-5-pyrimidinecarboxylic acid, ethyl ester (1.5 g.) and ethanol (100 ml.) is heated under reflux for 6 hours, treated with activated charcoal, and filtered. Chilling of the filtrate in ice causes separation of a precipitate which is collected and recrystallized from absolute ethanol to give 0.5 g. of the title compound, m.p. 179–181° C.

Analysis for $C_{18}H_{16}N_4O_3$.—Calculated: C, 64.27; H, 4.80; N, 16.66. Found: C, 64.45; H, 4.75; N, 16.45.

EXAMPLE III

4-[(3-Hydroxy-2-Pyridyl)Amino]-2-Phenyl-5-Pyrimidine-Carboxylic Acid, Ethyl Ester, Acetate To a pyridine solution (50 ml.) containing 4-[(3-hydroxy-2-pyridyl)amino]-2-phenyl - 5 - pyrimidinecarboxylic acid, ethyl ester (3.3 g.) is added dropwise acetic anhydride (1.2 g.). The resulting mixture is heated under reflux for 20 minutes. The excess pyridine is removed under reduced pressure to give an oily residue which solidifies on standing. The solid is triturated with water, and then recrystallized from ethanol to give 3.5 g. of the title compound, m.p. 99–101.5° C.

Analysis for $C_{20}H_{18}N_4O_4$.—Calculated: C, 63.48; H, 4.80; N, 14.81. Found: C, 63.57; H, 4.95; N, 14.70.

EXAMPLE IV

4-[(3-Hydroxy-2-Pyridyl)Amino]-2-Phenyl-5-Pyrimidine-Carboxylic Acid

A. From 4-(2-amino-3-pyridyloxy)-2-phenyl-5-pyrimidinecarboxylic acid, ethyl ester.

Alkaline hydrolysis of 4-(2-amino-3-pyridyloxy)-2-phenyl-5-pyrimidinecarboxylic acid, ethyl ester (15% aqueous sodium hydroxide) and subsequent acidification affords the title compound in a near quantitative yield. Recrystallization from dimethylformamide (DMF) affords a sample, m.p. 246–249° C.

Analysis for $C_{16}H_{12}N_4O_3$.—Calculated: C, 62.33; H, 3.92; N, 18.18. Found: C, 61.74; H, 4.00; N, 18.57.

B. From 4-[(3-hydroxy-2-pyridyl)amino]-2-phenyl - 5 - pyrimidinecarboxylic acid, ethyl ester.

Alkaline hydrolysis of 4-[(3-hydroxy - 2 - pyridyl) amino]-2-phenyl-5-pyrimidinecarboxylic acid ethyl ester affords the title compound in a quantitative yield, m.p. 243-245° C.

C. From 10-hydroxy-2-phenyl-5H-pyrido[1,2-a] pyrimido[4,5-]pyrimidin-5-one.

A mixture of 10-hydroxy-2-phenyl-5H-pyrido[1,2-a] pyrimido[4,5-d]pyrimidin-5-one (3.2 g.), 20% aqueous sodium hydroxide solution (30 ml.), and ethanol (15 ml.) is heated under reflux for 20 minutes, neutralized with concentrated hydrochloric acid and then made acidic with dilute hydrochloric acid. The precipitate is collected and washed with water to give the title compound, m.p. 245° dec.

EXAMPLE V

10-Hydroxy-2-Phenyl-5H-Pyrido[1,2-a]Pyrimido-[4,5-d]Pyrimidin-5-One

A. 4-(2 - Amino-3-pyridyloxy)-2-phenyl-5-pyrimidinecarboxylic acid, ethyl ester (1.0 g.) is heated at 210° C. for 20 minutes. After cooling to room temperature, the solid cake is recrystallized from dimethylformamide (DMF) to give 0.9 g. of the title compound, m.p. 261–263° C.

Analysis for $C_{16}H_{10}N_4O_2$.—Calculated: C, 66.20; H, 3.47; N, 19.30. Found: C, 66.39; H, 3.30; N, 19.42.

B. 4-[(3 - Hydroxy - 2 - pyridyl)amino]-2-phenyl-5-pyrimidinecarboxylic acid, ethyl ester (0.4 g.) is heated at 200° C. ±10° C. for 7 minutes. The solid cake thus obtained melts at 256° C. The mixture melting point with the sample prepared by method A is not depressed. The infrared spectrum of the compound is identical with that of the sample prepared by method A.

EXAMPLE VI

10-Hydroxy-2-Phenyl-5H-Pyrido[1,2-a]Pyrimido[4,5-d] Pyrimidin-5-One, Acetate

A. From 10-hydroxy - 2 - phenyl - 5H-pyrido[1,2-a] pyrimido[4,5-d]pyrimidin-5-one.

A mixture of 10-hydroxy - 2 - pheny-5H-pyrido[1,2-a] pyrimido[4,5-d]pyrimidin - 5 - one (1.8 g.) and acetic anhydride (60 ml.) is heated under reflux for 1.5 hours, then chilled in ice. The precipitate is collected, giving 2.0 g. of the title compound, m.p. 305–308° C.

Analysis for $C_{18}H_{12}N_4O_3$.—Calculated: C, 65.05; H, 3.64; N, 16.86. Found: C, 64.88; H, 3.91; N, 16.50.

B. From 4-[(3-hydroxy - 2 - pyridyl)amino]-2-phenyl-5-pyrimidinecarboxylic acid.

A mixture of 4-[(3-hydroxy-2-pyridyl)amino]-2-phenyl-5-pyrimidinecarboxylic acid (2.6 g.) and acetic anhydride (30 ml.) is refluxed gently for 1.5 hours. A solid is removed by filtration. Chilling of the filtrate causes separation of a precipitate which is collected and recrystallized from acetic anhydride to give the title compound, m.p. 293° C. (dec.). The infrared spectrum of this compound is identical with that of a sample prepared by method A.

C. From 4-(3-hydroxy - 2 - pyridylamino)-2-phenyl-5-pyrimidinecarboxylic acid, ethyl ester, acetate.

4-(3-Hydroxy - 2 - pyridylamino)-2-phenyl-5-pyrimidine-carboxylic acid, ethyl ester, acetate (0.6 g.) is heated at 220±5° C. for 15 minutes. The solid cake is recrystallized from dimethylformamide to afford the title compound, m.p. 293–296° C. A mixture m.p. with a sample prepared by method A is not depressed.

EXAMPLE VII

A compound of Formula I is administered orally (P.O.) or intraperitoneally (I.P.) to each of three mice. The animals are observed for signs of CNS-depressant activity, such as decreased motor activity, sedation, ataxia, loss of righting reflex, and decreased respiration. When tested as above-described, 10 - hydroxy - 2-pheny-5H-pyrido[1,2-a]pyrimido[4,5 - d]pyrimidin-5-one exhibited decreased motor activity and decreased respiration at 400 mg./kg. (P.O.); the acetate of said compound exhibited decreased motor activity, sedation-ataxia, ataxia, and decreased respiration at 127 mg./kg. (I.P.) and loss of righting reflex at 400 mg./kg. (I.P.).

What is claimed is:
1. A compound of the formula

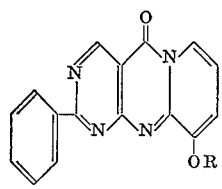

wherein R is hydrogen or lower alkanoyl.

2. The compound as defined in Claim 1, which is 10-hydroxy - 2 - phenyl - 5H - pyrido[1,2-*a*]pyrimido[4,5-*d*]pyrimidin-5-one.

3. The compound as defined in Claim 1, which is 10-hydroxy - 2 - phenyl - 5H - pyrido[1,2-*a*]pyrimido[4,5-*d*]pyrimidin-5-one, acetate.

4. A process for the preparation of 10-hydroxy-2-phenyl - 5H - pyrido[1,2-*a*]pyrimido[4,5-*d*]pyrimidin-5-one in which a 4-(2-amino-3-pyridyloxy)-2-phenyl - 5 - pyrimidinecarboxylic acid, (lower)alkyl ester is heated at a temperature ranging from about 160° C. to about 230° C.

5. A process as defined in Claim 4 in which the temperature range is about 190° C. to about 230° C.

References Cited

C.A. 46: 8127d (1952), Matsukawa et al., abstract of J. Pharm. Soc., Japan, 71: 1423–7.

NATALIE TROUSOF, Primary Examiner

S. D. WINTERS, Assistant Examiner

U.S. Cl. X.R.

260—256.4 C, 251 R, 256.4 N, 296 R; 424—251